United States Patent
Nagel

(10) Patent No.: US 7,046,192 B2
(45) Date of Patent: May 16, 2006

(54) RADAR PROCESS FOR CLASSIFYING OR IDENTIFYING HELICOPTERS

(75) Inventor: Dieter Nagel, Erbach (DE)

(73) Assignee: EADS Deutschland GmbH, Ottobrunn (DE)

( * ) Notice: Subject to any disclaimer, the term of this patent is extended or adjusted under 35 U.S.C. 154(b) by 77 days.

(21) Appl. No.: 10/800,692

(22) Filed: Mar. 16, 2004

(65) Prior Publication Data

US 2004/0239556 A1    Dec. 2, 2004

(30) Foreign Application Priority Data

Mar. 17, 2003    (DE) ................................ 103 11 880

(51) Int. Cl.
*G01S 7/41*    (2006.01)
*G01S 13/00*   (2006.01)

(52) U.S. Cl. ........................................ 342/192; 342/90
(58) Field of Classification Search ................. 342/90, 342/140, 192
See application file for complete search history.

(56) References Cited

U.S. PATENT DOCUMENTS

| | | | |
|---|---|---|---|
| 4,470,048 A | | 9/1984 | Short, III |
| 4,603,331 A | * | 7/1986 | Wehner ....................... 342/192 |
| 4,972,193 A | * | 11/1990 | Rice ............................ 342/90 |
| 4,992,797 A | * | 2/1991 | Gjessing et al. ............ 342/192 |
| 5,012,252 A | * | 4/1991 | Faulkner ..................... 342/192 |
| 5,191,343 A | * | 3/1993 | Danzer et al. .............. 342/193 |
| 6,573,861 B1 | * | 6/2003 | Hommel et al. ............ 342/192 |

FOREIGN PATENT DOCUMENTS

GB    2298330    8/1996

OTHER PUBLICATIONS

Linde, George, "Use of wideband waveforms for target recognition with surveillance radars",□□Radar Conference, 2000. The Record of the IEEE 2000 International, Publication Date: May 7-12, 2000 □□On pp.: 128-133, Alexandria, VA □□.*
Anthony Zyweek et al., "Radar Target Recognition Using Range Profiles", IEEE, Apr. 19, 1994, pp. 373-376, XP-000528497.
IEEE Transactions on Antennas and Propagation, vol. AP-34, No. 3, Mar. 1986, pp. 276-280.

* cited by examiner

*Primary Examiner*—Ian J. Lobo
(74) *Attorney, Agent, or Firm*—Crowell & Moring LLP

(57) ABSTRACT

A radar method of classifying generating or identifying helicopters, by generating a one-dimensional distance profile of the helicopter to be classified or to be identified by measuring the radar each of the helicopter fuselage, the radar echo of the rotor head of the main rotor and/or the radar echo of the main axis, and the radar echo of the rear rotor axis; determines the aspect angles in the azimuth and elevation directions relative to the axis of the radar antenna and the method also determines helicopter parameters from the measured radar echoes. The determined helicopter parameters are compared with stored helicopter parameters for different helicopter types.

8 Claims, 3 Drawing Sheets

$B_S$ = Radar bandwidth
$\Delta f$ = Distance between the radar channels

RADAR PROCESS FOR CLASSIFYING OR IDENTIFYING HELICOPTERS

BACKGROUND AND SUMMARY OF THE INVENTION

This application claims the priority of German Patent No. 103 11 880.2-55, filed 17 Mar. 2003, the disclosure of which is expressly incorporated by reference herein.

The invention relates to a radar method of classifying or identifying helicopters.

Known methods for the classification or identification of helicopters use one-dimensional distance profiles generated by radar. These are correlated with stored comparison profiles. The comparison profiles have to be generated for each helicopter type and any possible aspect angle (in the azimuth and elevation direction). For example, distance profiles for 100 discrete azimuth values (for example, from −180° to 180° in 3.6° steps) and, independently thereof, for 21 discrete elevation values (for example, from −40° to 40° in 4° steps) are generated in discrete steps. Thus, for one helicopter type, 100*21=2,100 distance profiles have to be generated and be retrievable in a data bank. When approximately 40 currently customary helicopter types are used as a basis, a total of over 82,000 distance profiles are required in order to carry out a reliable classification.

It is an object of the present invention to provide a classification method or an identification method for helicopters in which the volume of comparison data can be considerably reduced and by means of which the comparison data can be determined at low expenditures.

This task is achieved by generating a one-dimensional distance profile of the helicopter to be classified or to be identified by means of radar and determining the aspect angles in the azimuth and elevation directions relative to the axis of the radar antenna. The following radar echoes are measured in the one-dimensional distance profile:

(a) radar echo of the helicopter fuselage, (b) radar echo of the rotor head of the main rotor and/or the radar echo of the main rotor axis, (c) radar echo of the rear rotor axis;

The task further involves determining at least two of the following helicopter parameters from the measured radar echoes as well as the determined aspect angles:

(1) total length of the helicopter, (2) distance between the rotor axes of the main and rear rotor, (3) distance between the nose of the helicopter and the rotor axis of the main rotor;

Finally, the determined helicopter parameters are compared with stored helicopter parameters for different helicopter types.

Thus, no radar measuring data of helicopters is required as comparison data for the application of the invention. Only fixed helicopter parameters required as comparison data, which can be obtained from generally accessible sources, such as publications (Jane's "All the World's Aircraft") or on the Internet (http://fas.org).

The method according to the invention can be used from a flying platform (for example, a helicopter, a combat aircraft) as well as from a stationary radar antenna platform.

Other objects, advantages and novel features of the present invention will become apparent from the following detailed description of the invention when considered in conjunction with the accompanying drawings.

DETAILED DESCRIPTION OF THE PREFERRED EMBODIMENT

When taking distance profiles by means of radar with a high resolution (resolution less than 30 cm, typical distances in the range of from 20 to 30 km), the video signal essentially consists of four components. One component corresponds to the backscattering at the helicopter fuselage; another component corresponds to the backscattering at the rotor head around the main rotor axis. The two other components pertain to the scattering at the main and rear rotor.

When generating a one-dimensional distance profile of the helicopter, analytically, the following expression is obtained for the video signal:

$$S_{RHel}(t) = \sigma_{skin} \cdot a(t) + \sigma_B \cdot \delta_0(t-T_1) + \sigma_1 \cdot \delta_0(t-T_1) + \sigma_2 \cdot \delta_0(t-T_2)$$

Here, $\sigma_{skin}$ is the radar backscattering cross-section of the helicopter fuselage, and a(t) describes the signal length and the signal form of the helicopter fuselage. $\sigma_1$ and $\sigma_B$, together with the time $T_1$, describe the main rotor and the rotor head around the main rotor axis. $\sigma_2$, together with the time $T_2$, describe the rear rotor.

Figure 1:
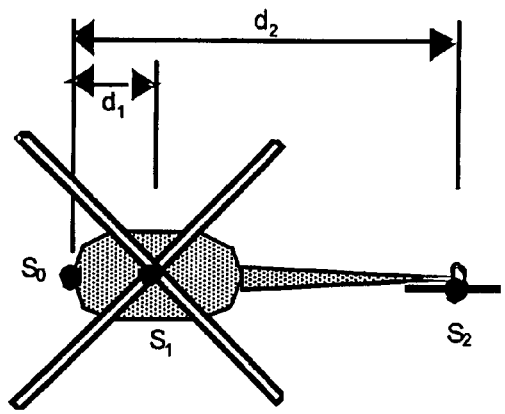
FIG. 1 is a view of a simplified model for the radar scattering on a helicopter.

FIG. 1 illustrates a simplified model for the radar backscattering on a helicopter (shown as a top view). The backscattering centers of the above-mentioned components are called $S_0$, $S_1$, $S_2$ (the backscattering centers of the main rotor and the rotor head coincide). They define two measurable distances $d_1$ and $d_2$ at the helicopter. In this case, $d_1$ is the distance between the nose of the helicopter and the rotor axis of the main rotor. Correspondingly, $d_2$ is the length between the nose of the helicopter and the rotor axis of the rear rotor.

Figure 2:
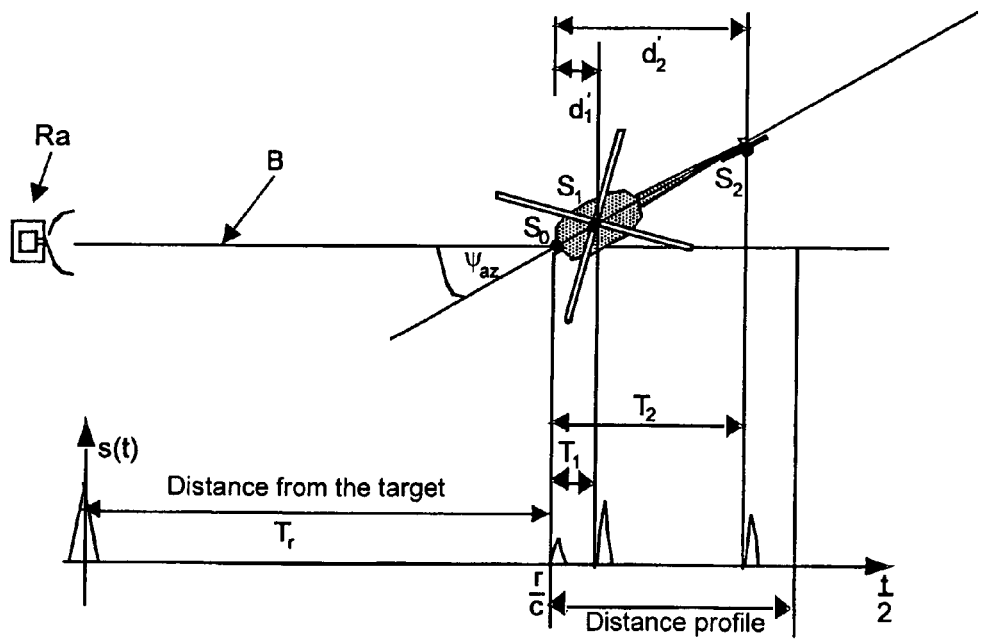
FIGS. 2, 3 are respective views of a simplified model for a radar distance profile of a helicopter.

FIG. 2 shows the situation (in the top view) during the generating of a distance profile of the helicopter by means of radar RA with an aspect angle in the azimuth $\Psi_{az}$ relative to the radar antenna axis B. FIG. 2 also shows the corresponding distance profile with the backscattering peaks for the helicopter fuselage, the rotor head/main rotor as well as the rear rotor.

The transit times $T_1$, $T_2$ within the target (helicopter) correspond to the distances $d_1'$, $d_2'$.

For the determination of the transit times $T_1$, $T_2$, the aspect angle in the azimuth $\Psi_{az}$ and elevation $\Psi_{el}$ relative to the radar antenna axis B has to be known. The aspect angles are obtained by means of extrapolation of tracking data from preceding measurements for the target detection. They are determined from the speed of the target as well as the inherent speed of the antenna platform.

The following relations apply to the above-dined parameters:

$$T_i = \frac{2d'_i}{c} \quad \underline{d}' = f(\underline{d}, \underline{\Psi}) \quad \underline{d}' = \begin{bmatrix} d'_1 \\ d'_2 \end{bmatrix} \quad \underline{\Psi} = \begin{bmatrix} \Psi_{az} \\ \Psi_{el} \end{bmatrix}$$

By determining the transit times $T_i$, conclusions can be drawn with respect to the helicopter parameters $d_i$. This permits classification/identification of the helicopter exclusively by means of stored helicopter parameters.

The signal processing for obtaining the signal transit times $T_i$ can be implemented by methods which are known per se.

Figure 3:
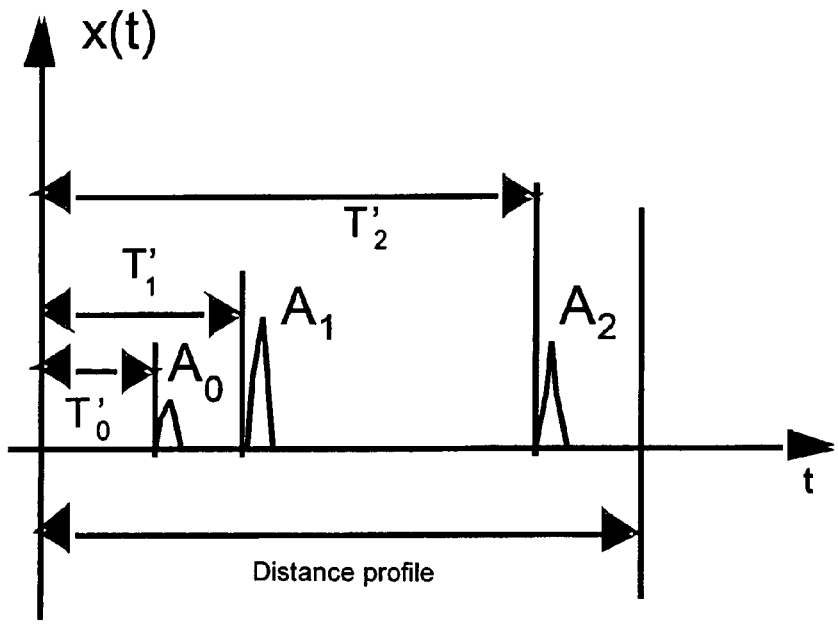
Figure 4:
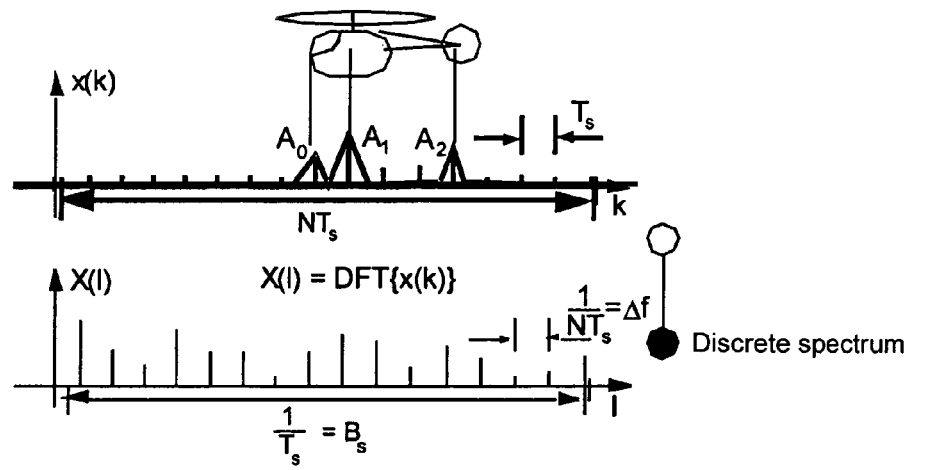
FIG. 4 is a view of a measured distance profile of a helicopter in the frequency range obtained by a stepped-frequency technique (bottom) as well as of the corresponding distance profile in the time domain (top)

In the following, a method will be illustrated as an example with reference to FIGS. 3 to 5.

The helicopter signal $S_{RHel}(t)$ can be approximated by a signal which contains three signal pulses ("spikes") in the time domain. The signal is illustrated in FIG. 3 and is called x(t) there.

$$x(t) = A_0 \cdot \delta_0(t-T_0') + A_1 \cdot \delta_0(t-T_1') + A_2 \cdot \delta_0(t-T_2')$$

The Fourier transform X(f) of the signal x(t) is:

$$X(f) = A_0 \cdot e^{-j2\pi f T_0'} + A_1 \cdot e^{-j2\pi f T_1'} + A_2 \cdot e^{-j2\pi f T_2'}$$

While applying the stepped frequency method known to the person skilled in the art, this Fourier transform, which is present in the form of discrete sampling values $X(l\Delta f)$, is measured directly (see FIG. 4, bottom), wherein $\Delta f$ is the frequency difference of the individual radar channels and $l=1, \ldots, N$ is the number of radar channels.

For estimating the transit time parameters $T_0'$, $T_1'$, $T_2'$ (in comparison to the above-mentioned transit times $T_i$, these refer to a different—arbitrary—zero point), advantageously, super-resolution processing techniques, such as maximum likelihood estimation, maximum entropy estimation and MUSIC estimation, can be used which are known to a person skilled in the art. The MUSIC method (Multiple Signal Classification) is described, for example, in R. O. Schmidt in *IEEE Transactions on Antennas and Propagation*, Vol. AP-34, No. 3, March 1986, Pages 276–280. It is the object of these methods to obtain from the measured Fourier transform $X(l\Delta f)$ in the frequency range an estimation of the corresponding signal x(k) in the time domain (FIG. 4, top).

As explained above, it is assumed for this estimation that the part of the helicopter profile that is of interest in the time domain consists of three pulses ("spikes"). In the frequency range, these spikes correspond to three monochromatic signals.

With $l=1, \ldots, N$, the model signal S(l) is therefore $$S(l) = A \cdot e^{-j2\pi \Delta f T}$$

The measured signal is $Y(l) = X(l) + W(l)$, $l=1 \ldots, N$, with the noise values W(l). Written in vector form, the following representation is obtained $\underline{Y} = \underline{X} + \underline{W}$.

The correlation matrix $\underline{M}$ is: $\underline{M} = \underline{YY}^*$.

The estimation according to the maximum likelihood estimation method results in the following:

$$P_{ML}(T) = \frac{1}{S*(T)M^{-1}S(T)}$$

When using the maximum entropy estimation, the following estimation is obtained:

$$P_{ME}(T) = \frac{1}{S^T(T)M^{-1}M^{-1}*S*(T)}$$

The estimation according to the MUSIC method results in the following:

$$P_{MU}(T) = \frac{1}{S^T(T)\Phi_M\Phi_M*S*(T)}$$

wherein $\Phi_M$ is a submatrix pertaining to the inherent noise values. When three spikes are assumed in the helicopter distance profile, N-3 inherent noise values are obtained.

Figure 5:
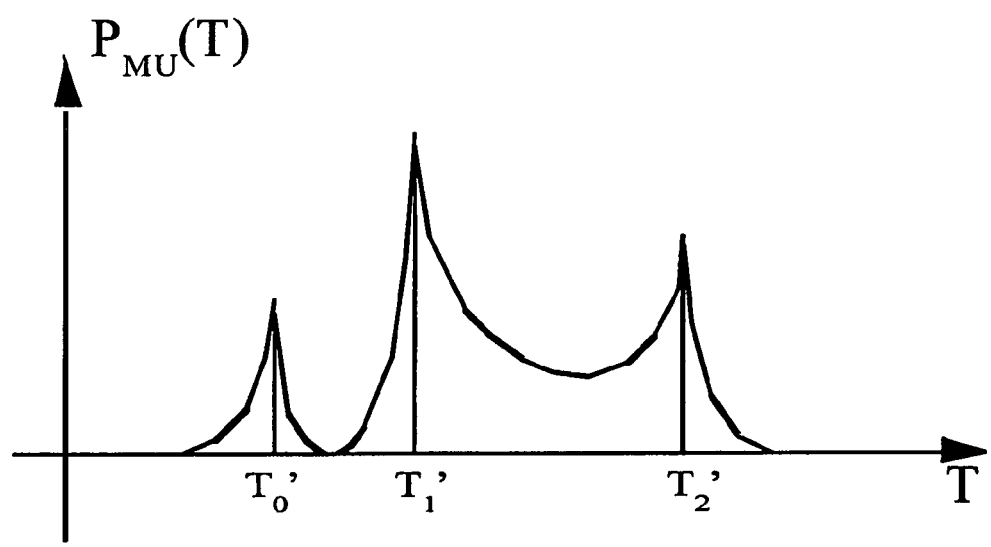
FIG. 5 is a view of a distance profile of a helicopter obtained by the use of the MUSIC method.

FIG. 5 shows a helicopter distance profile in the time domain, which was obtained by an estimation by means of the MUSIC method from the measured distance profile in the frequency range. By means of the values for $T_0'$, $T_1'$, $T_2'$ contained therein, the wanted helicopter parameters can be computed directly when the aspect angles $\Psi_{az}$, $\psi_{el}$ are known.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A radar method of classifying or identifying helicopters, comprising the steps:
    generating a one-dimensional distance profile of a helicopter to be classified or to be identified by means of radar (Ra), a radar echo of the helicopter fuselage, at least one of a radar echo of the rotor head of the main rotor and a radar echo of the main rotor axis, and a radar echo of the rear rotor axis,
    determining aspect angles in azimuth and elevation directions relative to an axis of an antenna of the radar,
    determining at least two helicopter parameters from the measured radar echoes as well as from the determined aspect angles, said at least two helicopter parameters including total length of the helicopter, a distance between the rotor axes of the main and rear rotor, and a distance between the nose of the helicopter and the rotor axis of the main rotor,
    comparing the determined helicopter parameters with stored helicopter parameters for different helicopter types.

2. The method according to claim 1, wherein generating of the one-dimensional distance profile takes place by means of a stepped frequency method directly in a frequency range.

3. The method according to claim 2, wherein measuring of the radar echoes takes place by using super resolution methods, including maximum likelihood estimation, maximum entropy estimation or MUSIC estimation.

4. A method of classifying helicopters, comprising the steps:
    generating a one-dimensional distance profile of a helicopter by measuring a plurality of radar echoes of a corresponding plurality of rotor physical characteristics determining aspect angles in azimuth and elevation direcand by measuring a radar echo of a main structural portion of the helicopter, tion relative to an axis of a radar, determining a plurality of helicopter parameters from said generated one-dimensional profile and said determined aspect angles.

5. The method according to claim 4 wherein said plurality of parameters include total length of the helicopter, distance between a rotor axes of a main and rear rotor, and a distance between a nose and the rotor axis of the main rotor of the helicopter.

6. The method according to claim 4, further including the step of comparing the determined helicopter parameters with stored helicopter parameters for different helicopters.

7. The method according to claim 4, wherein generating of the one-dimensional distance profile takes place by means of a stepped frequency method directly in a frequency range.

8. The method according to claim 4, wherein measuring of the radar echoes takes place by using super resolution methods, including maximum likelihood estimation, maximum entropy estimation or MUSIC estimation.

* * * * *